(No Model.) 2 Sheets—Sheet 1.
F. H. REDEKER & F. J. TIMMERWILKE.
EMBOSSING ROLLER.
No. 567,918. Patented Sept. 15, 1896.
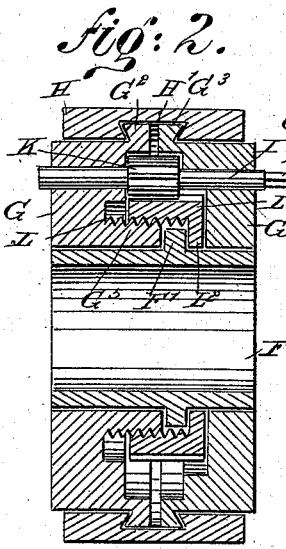
Fig. 2.
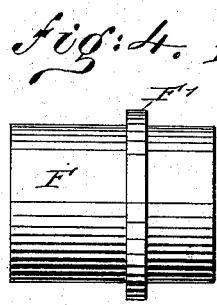
Fig. 4.
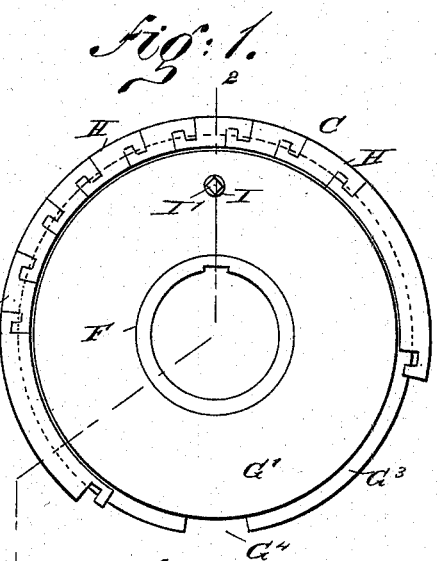
Fig. 1.
Fig. 3.
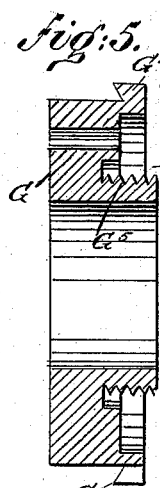
Fig. 5. Fig. 6. Fig. 7.
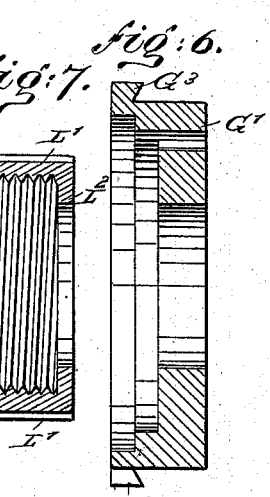
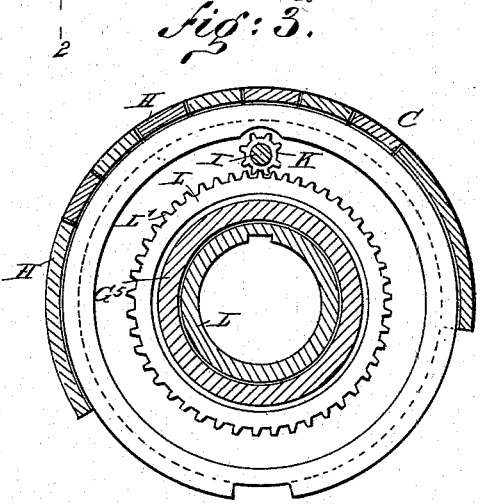
Fig. 8.
Fig. 9.
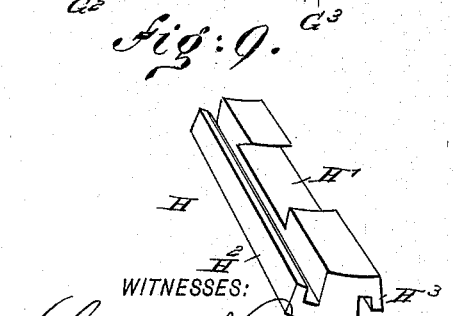
WITNESSES:
Chas. Niole
Theo. G. Hoskin
INVENTORS
F. H. Redeker
F. J. Timmerwilke
BY Munn & Co
ATTORNEYS.

(No Model.) 2 Sheets—Sheet 2.
F. H. REDEKER & F. J. TIMMERWILKE.
EMBOSSING ROLLER.
No. 567,918. Patented Sept. 15, 1896.
*Fig: 10.*
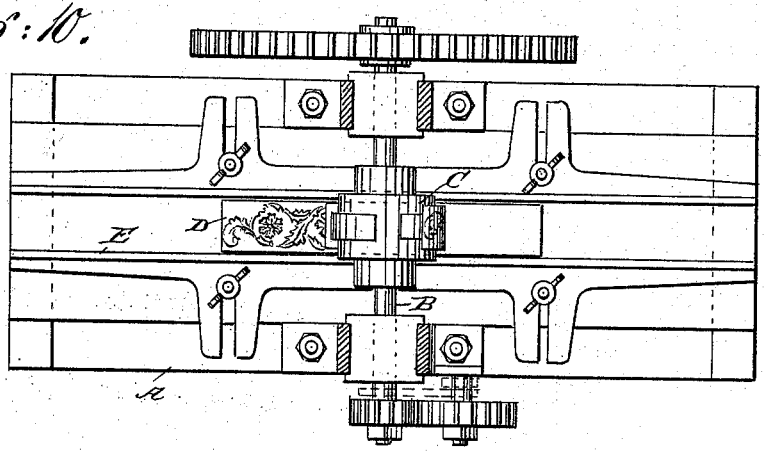
*Fig: 11.*
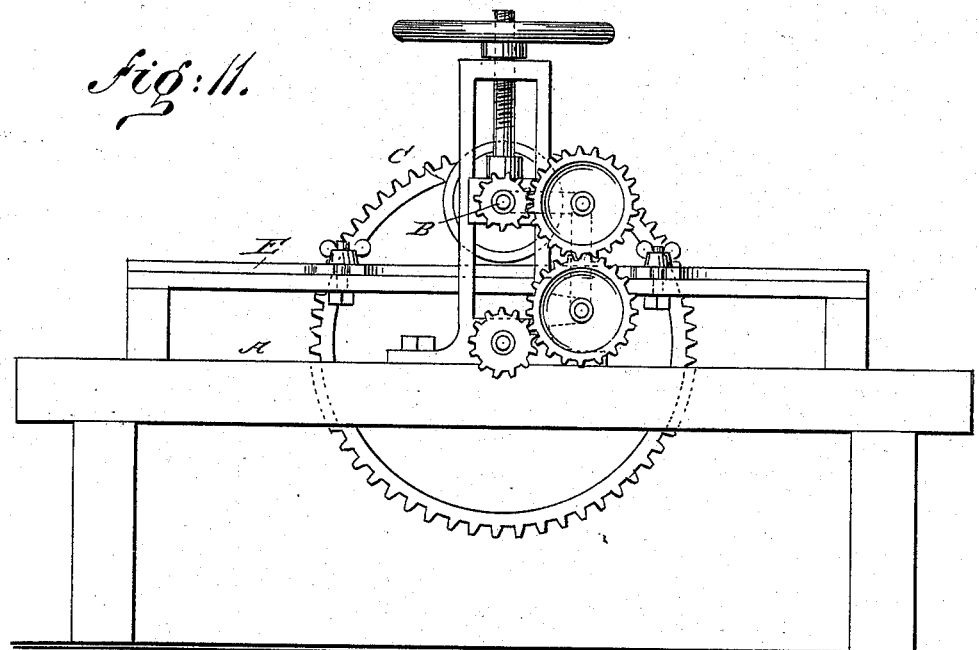
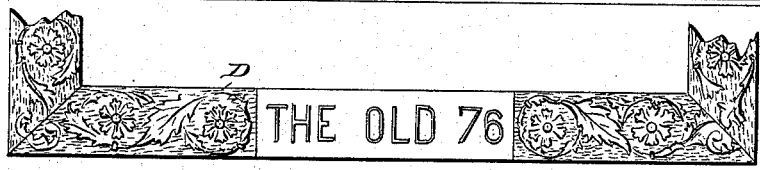
*Fig: 12.*
WITNESSES:
INVENTORS
F. H. Redeker
F. J. Timmerwilke
BY Munn & Co.
ATTORNEYS.

UNITED STATES PATENT OFFICE.

FERDINAND H. REDEKER AND FRANK J. TIMMERWILKE, OF CINCINNATI, OHIO.

EMBOSSING-ROLLER.

SPECIFICATION forming part of Letters Patent No. 567,918, dated September 15, 1896.

Application filed June 26, 1895. Serial No. 554,110. (No model.)

*To all whom it may concern:*

Be it known that we, FERDINAND H. REDEKER and FRANK J. TIMMERWILKE, of Cincinnati, in the county of Hamilton and State of Ohio, have invented a new and Improved Embossing-Roller, of which the following is a full, clear, and exact description.

The invention relates to machines for ornamenting picture-moldings and other articles; and its object is to provide a new and improved embossing-roller which is simple and durable in construction and arranged to permit of conveniently and rapidly changing the characters on the roller to produce any desired lettering or ornamentation without requiring the use of costly dies, as heretofore practiced.

The invention consists, principally, of an embossing-roller provided with a body having a peripheral rim adapted to receive and support separate embossing-characters.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1 is a side elevation of the improvement. Fig. 2 is a sectional view of the same on the line 2 2 of Fig. 1. Fig. 3 is a central vertical section of the same. Fig. 4 is a side elevation of the sleeve. Fig. 5 is a cross-section of one of the type-carriers. Fig. 6 is a similar view of the other type-carrier. Fig. 7 is a like view of the nut for moving the type-carriers toward and from each other. Fig. 8 is a perspective view of a type-character. Fig. 9 is an inverted perspective view of the same. Fig. 10 is a sectional plan view of the complete machine, showing the roller applied. Fig. 11 is a side elevation of the same, and Fig. 12 is a face view of the work produced.

The improved embossing-roller, hereinafter more fully described in detail, may be employed on an embossing-machine of any approved construction.

The embossing-machine illustrated in Figs. 10 and 11 is provided with the usual frame A, in which is journaled a roller-shaft B, driven by suitable gear-wheels and carrying an embossing-roller C, adapted to emboss wood or other material D, fed on a longitudinally-extending table E, supported on the frame A.

The embossing-roller C is provided with a sleeve F, keyed or otherwise fastened on the shaft B and receiving two carriers G and G' in the form of rings and fitted to slide toward or from each other on the sleeve F. The type-carriers G and G' are provided with peripheral dovetails $G^2$ and $G^3$ at or near their inner adjacent faces, the said dovetails being cut out, as at $G^4$, to admit the type-characters H, each formed with a dovetail H', adapted to engage the two dovetails $G^2$ and $G^3$ on the type-carriers G and G', as is plainly illustrated in Fig. 2.

Each of the type-characters H is made in the shape of a segment, and is formed on its outer face with a type-character in the shape of a letter, numeral, ornament, &c., to be embossed on the wood or other material. Each type-character H is formed on one side with a projecting tongue $H^2$, adapted to interlock with a corresponding tongue $H^3$ on the opposite character, it being understood that each type-character is provided with two such tongues $H^2$ and $H^3$, which extend, however, in opposite directions, as plainly indicated in Figs. 8 and 9. Thus each type-character H is passed over the two type-carriers G and G' at the cut-out space $G^4$, and then the type-character is shoved upon the two dovetails, and the next following character is likewise treated and interlocked with the preceding character, as will be readily understood by reference to Figs. 1 and 2.

The type-characters are placed on the carriers in regular order to press the desired design, as will be readily understood by reference to the work produced and shown in Fig. 12. Each type-character may carry one, two, or more characters, or a complete ornament, to permit of uniting letters and numerals, to produce, for instance, the legend "The Old 76" with ornaments at the ends, as will be readily understood by reference to Figs. 1 and 12. Now in order to securely hold the type-characters in position on the carriers the following device is provided: In the carriers G and G' is journaled a transversely-extending shaft I, formed at one outer end with a square offset I', adapted to be engaged by a wrench or like tool J, to permit the operator to turn the said shaft in the carriers. On the shaft I is secured a pinion K, extending loosely in an annular recess formed in the carriers and engaging a gear L', formed exteriorly on a nut L, screwing on the threaded hub $G^5$ of the carrier G. The nut L is also provided with an inwardly-extending annular flange $L^2$, abutting against one side of an external annular flange F', formed or secured on the sleeve F. Now it will be seen that when the shaft I is turned the nut L is rotated and screwed on the threaded hub $G^5$, whereby the two carriers G and G' are moved toward or from each other, according to the direction in which the shaft I is turned. Thus after the type-characters H have been placed loosely in position on the type-carriers, as previously explained, and interlocked one with the other, then the operator turns the shaft I by means of the tool J to move the type-carriers G and G' apart, so that their dovetails $G^2$ and $G^3$ bind in the dovetailed grooves of the type-characters, and consequently lock the same firmly in place on the roller. When this has been done, then the sleeve F is placed on the shaft, and as the said sleeve is provided with a keyway to engage a key on the shaft it rotates with the latter, and consequently the type-characters make an impression on the material under treatment, and as complete fonts of type may be held in stock any desired ornament may be formed on the material.

By the arrangement described any desired name of a business house, firm, or the like can be readily set up and embossed on the work under treatment.

It is understood that the device is applicable on moldings covered with plastic compositions or directly on the wood or other material, as the case may be.

By the arrangement described the expensive dies heretofore employed are entirely dispensed with.

Having thus fully described our invention, we claim as new and desire to secure by Letters Patent—

1. An embossing-roller, comprising a sleeve adapted to be secured on a shaft, type-carriers mounted to slide on the said sleeve, and each provided with a dovetail on its periphery, type-characters having dovetailed grooves engaging the said dovetails, and means for moving the type-carriers apart to lock the type-characters in position, substantially as shown and described.

2. An embossing-roller, comprising two type-carriers, each having a rib and recesses on their contiguous faces, a nut within said recesses and engaging each type-carrier, a shaft journaled in the type-carriers, a pinion on the shaft and meshing with the nut and type-characters, substantially as described.

3. An embossing-roller, comprising the combination of a sleeve having a rib thereon, two type-carriers embracing the rib and each having a peripheral rib and recesses in their contiguous faces, a nut located in the recesses and having a flange engaging the rib of the sleeve, a shaft revolubly journaled in the type-carriers, and a pinion carried by the shaft and meshing with the nut, substantially as described.

4. An embossing-roller, comprising two type-carriers, type-characters, means for holding the type-characters on the carriers and a nut between the type-carriers and capable of spreading the same to fasten the type-characters, substantially as described.

5. An embossing-roller, comprising a type-carrier, type-characters and means whereby the characters are held against lateral movement on the type-carriers, the type-characters having interlocking contiguous sides whereby they are held from movement longitudinally on the periphery of the roller, substantially as described.

6. An embossing-roller, comprising two type-carriers, a nut between the carriers and capable of spreading the same, a shaft journaled in the carriers, a pinion carried by the shaft and meshing with the nut, type-characters and means whereby the type-characters are engaged with the type-carriers, substantially as described.

FERDINAND H. REDEKER.
FRANK J. TIMMERWILKE.

Witnesses:
CHRIS ERHART,
WM. P. SMITH.